US008090526B2

(12) United States Patent
Marty et al.

(10) Patent No.: US 8,090,526 B2
(45) Date of Patent: Jan. 3, 2012

(54) METHOD FOR DETERMINING THE HORIZONTAL PROFILE OF A FLIGHT PLAN COMPLYING WITH A PRESCRIBED VERTICAL FLIGHT PROFILE

(75) Inventors: Nicolas Marty, Saint Sauveur (FR); Gilles Francois, Toulouse (FR); Elias Bitar, Tournefeuille (FR)

(73) Assignee: Thales (FR)

( * ) Notice: Subject to any disclaimer, the term of this patent is extended or adjusted under 35 U.S.C. 154(b) by 895 days.

(21) Appl. No.: 12/094,656

(22) PCT Filed: Nov. 11, 2006

(86) PCT No.: PCT/EP2006/068581

§ 371 (c)(1), (2), (4) Date: May 22, 2008

(87) PCT Pub. No.: WO2007/065781

PCT Pub. Date: Jun. 14, 2007

(65) Prior Publication Data

US 2008/0306680 A1 Dec. 11, 2008

(30) Foreign Application Priority Data

Dec. 7, 2005 (FR) .................................... 05 12420

(51) Int. Cl.
*G01C 21/00* (2006.01)
*G01C 23/00* (2006.01)

(52) U.S. Cl. ............ 701/201; 701/3; 701/202; 701/203; 701/206

(58) Field of Classification Search ........................ None
See application file for complete search history.

(56) References Cited

U.S. PATENT DOCUMENTS 4,821,990 A 4/1989 Porter et al.

(Continued)

FOREIGN PATENT DOCUMENTS

FR 2864312 6/2005

(Continued)

OTHER PUBLICATIONS

Borgefors, Gunilla, "Distance Transformation in Digital Images." published in the review: Computer Vision, Graphics and Image Processing, vol. 34, p. 344-378, Feb. 1986.

*Primary Examiner* — Khoi Tran
*Assistant Examiner* — Bao Long T Nguyen
(74) *Attorney, Agent, or Firm* — Lowe Hauptman Ham & Berner, LLP

(57) ABSTRACT

The present invention relates to the definition, in a flight plan, of the horizontal profile of an air route with vertical flight and speed profile prescribed on departure and/or on arrival, by a stringing together of check-points and/or turn points associated with local flight constraints and called "D-Fix" because they are not listed in a published navigation database like those called "Waypoints". It consists in charting, on curvilinear distance maps, a direct curvilinear path joining the departure point to the destination point of the air route while complying with vertical flight and speed profiles prescribed on departure and/or on arrival and while guaranteeing a circumnavigation of the surrounding reliefs and compliance with regulated overfly zones, then in approximating the series of points of the direct curvilinear path by a sequence of straight segments complying with an arbitrary maximum deviation threshold relative to the points of the series and an arbitrary minimum lateral deviation threshold relative to the set of obstacles to be circumnavigated and in adopting as "D-Fix" points the points of the intermediate intersections of the rectilinear segments.

20 Claims, 10 Drawing Sheets

U.S. PATENT DOCUMENTS

| | | | | |
|---|---|---|---|---|
| 4,862,373 | A * | 8/1989 | Meng | 701/209 |
| 6,097,996 | A * | 8/2000 | Deker | 701/10 |
| 6,163,744 | A * | 12/2000 | Onken et al. | 701/3 |
| 6,259,988 | B1 * | 7/2001 | Galkowski et al. | 701/202 |
| 6,266,610 | B1 | 7/2001 | Schultz et al. | |
| 7,054,742 | B2 * | 5/2006 | Khavakh et al. | 701/209 |
| 7,194,353 | B1 * | 3/2007 | Baldwin et al. | 701/206 |
| 7,356,405 | B1 * | 4/2008 | Nesbit | 701/202 |
| 7,433,781 | B2 * | 10/2008 | Bitar et al. | 701/208 |
| 7,447,593 | B2 * | 11/2008 | Estkowski et al. | 701/301 |
| 7,474,960 | B1 * | 1/2009 | Nesbitt | 701/209 |

FOREIGN PATENT DOCUMENTS

| | | |
|---|---|---|
| FR | 2868835 | 10/2005 |
| FR | 2860292 | 12/2005 |
| FR | 2871878 | 12/2005 |
| FR | 2875899 | 3/2006 |

* cited by examiner

METHOD FOR DETERMINING THE HORIZONTAL PROFILE OF A FLIGHT PLAN COMPLYING WITH A PRESCRIBED VERTICAL FLIGHT PROFILE

CROSS-REFERENCE TO RELATED APPLICATIONS

The present Application is based on International Application No. PCT/EP2006/068581, filed on Nov. 16, 2006, which in turn corresponds to French Application No. 05 12420, filed on Dec. 7, 2005, and priority is hereby claimed under 35 USC §119 based on these applications. Each of these applications are hereby incorporated by reference in their entirety into the present application.

FIELD OF THE INVENTION

The present invention relates to the definition, in a flight plan, of the horizontal profile of an air route with vertical flight and speed profile prescribed on departure and/or on arrival, by a stringing together of check-points and/or turn points associated with local flight constraints and called "D-Fix" ("Dynamic FIX") because they are not listed in a published navigation database like those called "Waypoints".

BACKGROUND OF THE INVENTION

The check- and/or turn points "Waypoints" listed in the published navigation databases complying with the ARINC-424 standard can be used to define the commonest air routes. For the others, they are often used only to define departure and arrival paths compliant with published approach procedures. Between these prescribed approach paths on departure and/or on arrival, the creation of the air route uses check- and/or turn points "D-Fix" which serve the same purposes as the "Waypoints" with respect to the manual piloting by the intervention of the pilot or with respect to the automatic piloting by the intervention of a flight management computer or an automatic pilot, but the definition of which is the responsibility of the operator. The creation of these check- and/or turn points "D-Fix" presupposes the choice of an air route plot joining, by the shortest path, a departure point to a destination point, taking into account the relief of the region being flown over, regulatory overfly restrictions and lateral maneuvering capabilities of the aircraft having to travel the route, said maneuvering capabilities being dependent on the aircraft and its flight configuration. Often, the choice of the plot of the air route must comply with a vertical flight and speed profile that is prescribed, either by circumstances, or by the desire to minimize the cost of the mission, for example by searching for a minimum fuel consumption.

There is a large body of literature on how to determine the horizontal profile of the air route that an aircraft must follow to fulfill the objectives of a mission for the lowest cost, the cost being assessed in terms of local constraints, taking into consideration the speed of the aircraft, the maximum acceptable lateral acceleration, the risks of collisions with the relief, enemy threats in the case of a military mission, deviations relative to a direct path and the extra length traveled compared to the shortest path. The literature mainly contains methods consisting in subdividing the region being flown over into individual cells by means of a geographic locating grid, choosing a sequence of individual cells to be followed to go, at the lowest cost, from the departure point to the destination point, and placing along the sequence of chosen individual cells check- and/or turn points "D-Fix" compatible with a flyable path. Among these methods, there are so-called grid-based methods, one example of which is described in the American patent U.S. Pat. No. 4,812,990, which implement a search for a minimum cost path out of all the possible paths linking the departure point to the destination point via the centers of the cells of the grid, so-called graph-based methods, one example of which is described in the American patent U.S. Pat. No. 6,266,610, which implement a search for a minimum cost path out of all the paths linking the departure point to the destination point via the sides or the diagonals of the cells and hybrid grid- and graph-based methods such as that described in the American patent U.S. Pat. No. 6,259,988.

All these methods come up against the difficulty of finding a sequence of individual cells resulting in a minimum cost path, caused by the large number of possible sequences, a number that increases exponentially when the pitch of the geographic location grid is tightened. Most of them propose progressive, step-by-step plotting methods that seek to limit as quickly as possible the search field out of all of the possible sequences, but they always demand very significant computation power, which is often not available on board an aircraft. Furthermore, they take little or no account of the comfort imperatives of civilian transport aircraft which require the frequency and rapidity of changes of heading or altitude to be minimized.

In fact, the problem of determining the horizontal profile of an air route lies in determining a curvilinear path that is direct and therefore of minimum length, circumnavigating the reliefs that cannot be crossed with the prescribed vertical flight and speed profile. This determination of a direct curvilinear path is based on estimations of curvilinear distances in the presence of static constraints (obstacles to be circumnavigated) and dynamic constraints (vertical flight and speed profile). Now, such estimations can be made with a lower computation cost, in the way described in the French patent application FR 2.860.292, by means of propagation distance transforms, also called chamfer distance transforms, which make do with computations on integer numbers.

The applicant has already proposed, in the French patent applications FR 2.864.312 and FR 2.868.835, the implementation of propagation distance transforms to create curvilinear distance maps in the context of a display of electronic aeronautical navigation maps showing the reliefs to be circumnavigated in the region being flown over and the lateral safety margins to be observed, and in the context of aircraft guidance toward a safe zone, with no maneuvering constraint in the horizontal plane, notably to negate an established risk of collision with the ground.

SUMMARY OF THE INVENTION

It is an objective of the present invention to determine, by searching for a lower computation cost, a sequence of check- and/or turn points "D-Fix" defining, with their associated constraints, a flight plan air route, going from a departure point to a destination point complying with vertical flight and speed profiles prescribed on departure and/or on arrival and guaranteeing a circumnavigation of the surrounding reliefs.

The invention is directed to is a method for determining the horizontal profile of an aircraft flight plan route leading from a departure point to a destination point, complying with vertical flight and speed profiles prescribed on departure and/or on arrival and taking account of the relief and of regulated overfly zones, said method comprising the following steps:

creating two curvilinear distance maps covering a maneuver zone containing the departure point and destination point and including one and the same set of obstacles to be circumnavigated taking into account the relief, the regulated overfly zones and the vertical flight and speed profiles prescribed on departure and/or on arrival, the first having the departure point as the origin of the distance measurements and the second, the destination point as the origin of the distance measurements, creating a third curvilinear distance map by summation, for each of its points, of the curvilinear distances that are assigned to them in the first and second curvilinear distance maps, charting, in the third curvilinear distance map, a connected set of iso-distance points forming a sequence of parallelograms and/or of points linking the departure point and destination point, selecting, from the charted connected set of iso-distance points, a series of consecutive points going from the departure point to the destination point via diagonals of its parallelograms, the series being called direct path, approximating the series of points of the direct path by a sequence of straight segments complying with an arbitrary maximum deviation threshold relative to the points of the series and an arbitrary minimum lateral deviation threshold relative to the set of obstacles to be circumnavigated, and choosing points of the intermediate junctions of the straight segments as check-points or turn points "D-Fix" in the flight plan.

Advantageously, when there is only one vertical flight and speed profile prescribed on departure, the first curvilinear distance map having the departure point as the origin of the distance measurements is created by taking account of the static constraints due to the relief and to the regulated overfly zones and the dynamic constraint due to the vertical flight and speed profile prescribed on departure whereas the second curvilinear distance map having the destination point as the origin of the distance measurements is created from the set of obstacles to be circumnavigated appearing in the first curvilinear distance map.

Advantageously, when there is only one vertical flight and speed profile prescribed on arrival, the second curvilinear distance map having the destination point as the origin of the distance measurements is created by taking account of the static constraints due to the relief and to the regulated overfly zones and the dynamic constraint due to the vertical flight and speed profile prescribed on arrival whereas the first curvilinear distance map having the point of departure as the origin of the distance measurements is created from the set of obstacles to be circumnavigated appearing in the second curvilinear distance map.

Advantageously, when there are vertical flight and speed profiles prescribed on departure and on arrival, the first and second curvilinear distance maps are created from a set of obstacles to be circumnavigated appearing in two outlines of these curvilinear distance maps:

an outline of the first curvilinear distance map having the departure point as the origin of the distance measurements created by taking account of the static constraints due to the relief and to the regulated overfly zones and the dynamic constraint due to the vertical flight and speed profile prescribed on departure, and an outline of the second curvilinear distance map having the destination point as the origin of the distance measurements being created by taking account of the static constraints due to the relief and to the regulated overfly zones and the dynamic constraint due to the vertical flight and speed profile prescribed on arrival.

Advantageously, the set of obstacles to be circumnavigated is complemented by the points of the first and second maps assigned estimations of curvilinear distance showing discontinuities in relation to those assigned to points in the near vicinity.

Advantageously, the set of obstacles to be circumnavigated taken into account in the curvilinear distance maps is complemented by lateral safety margins dependent on the flat turn capabilities of the aircraft in its configuration of the moment, when approaching the relief and/or the regulated overfly zone concerned, resulting from following the prescribed vertical flight and speed profile.

Advantageously, the lateral safety margins added to the set of obstacles to be circumnavigated are determined from a curvilinear distance map having the set of obstacles to be circumnavigated as the origin of the distance measurements.

Advantageously, the local thickness of a lateral safety margin takes account of the local wind.

Advantageously, the local thickness of a lateral safety margin takes account of the change of heading needed to circumnavigate a relief and/or a regulated overfly zone.

Advantageously, the local thickness of a lateral safety margin corresponds to a minimum flat turn radius allowed for the aircraft in its configuration of the moment.

Advantageously, the maximum deviation threshold of the sequence of straight segments in relation to the series of points of the direct path is of the order of a minimum flat turn half-radius allowed for the aircraft in its configuration of the moment.

Advantageously, the curvilinear distance maps are created by means of a propagation distance transform.

Advantageously, the approximation of the series of points of the direct path by a sequence of rectilinear segments is obtained by a progressive construction during which the departure point or respectively destination point of the direct path is taken as the origin of a first segment that is enlarged by adding one by one consecutive points as long as it does not penetrate into the set of listed obstacles to be circumnavigated and that its deviation relative to the points of the direct path that it short-circuits complies with the arbitrary maximum deviation allowed threshold, other rectilinear segments constructed in the same way being added to the series as long as the destination point, or respectively departure point, of the direct path is not reached.

Advantageously, the approximation of the series of points of the direct path by stringing together rectilinear segments is obtained by a dichotomic construction during which the departure point and the destination point of the direct path are initially linked by a rectilinear segment that is replaced, when it penetrates into the set of listed obstacles to be circumnavigated or its deviation relative to the points of the direct path that it short-circuits exceeds the arbitrary maximum deviation allowed threshold, with a stringing together of two rectilinear segments intersecting at the point of the direct path that is furthest away out of those that it short-circuits, each new segment being in turn replaced by a stringing together of two new segments intersecting at the point of the direct path that is furthest away out of the short-circuited points when it penetrates into the set of obstacles to be circumnavigated or its deviation relative to the points of the direct path that it short-circuits exceeds the arbitrary maximum deviation allowed threshold.

The method for determining the horizontal profile of a flight plan route is advantageously implemented during a flight, on a "Dir-to" request to reach a geographic point made by the crew to the flight management computer of the aircraft.

The method for determining the horizontal profile of a flight plan route is advantageously implemented on preparing military or civil security missions.

The method for determining the horizontal profile of a flight plan route is advantageously implemented in a system for reaching a fallback airport in the event of engine failure.

The method for determining the horizontal profile of a flight plan route is advantageously implemented in a flight plan discontinuity management system.

The method for determining the horizontal profile of a flight plan route is advantageously implemented in a system for automatically reaching predetermined positions for pilotless aircraft.

The method for determining the horizontal profile of a flight plan route is advantageously implemented, in a security context, in a system for automatically reaching predetermined positions for piloted aircraft out of control.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

The method, which is to be described, of determining or plotting a horizontal air route profile that complies with the relief, regulated overfly zones and vertical flight and speed profiles prescribed on departure and/or on arrival, is based on the propagation distance transforms technique applied to air navigation, in a context of static constraints consisting of reliefs to be circumnavigated and regulated overfly zones to be complied with, and dynamic constraints consisting of a prescribed vertical flight and speed profile.

Propagation distance transforms first appeared in image analysis for estimating the distances between objects. These include chamfer mask distance transforms, examples of which are described by Gunilla Borgefors in an article entitled "Distance Transformation in Digital Images", published in the review: Computer Vision, Graphics and Image Processing, vol. 34 pp. 344-378 in February 1986.

The distance between two points of a surface is the minimum length of all the possible paths over the surface starting from one of the points and ending at the other. In an image made up of pixels distributed on a regular mesh of rows, columns and diagonals, a chamfer mask distance transform estimates the distance of a pixel, called "target" pixel, from one or several pixels called "source" pixels, by progressively constructing, starting from the source pixels, the shortest possible path according to the mesh of the pixels and ending at the target pixel, and by using distances found for the pixels of the image that have already been analyzed and a so-called chamfer mask table listing the values of the distances between a pixel and its near neighbors.

Figure 1:
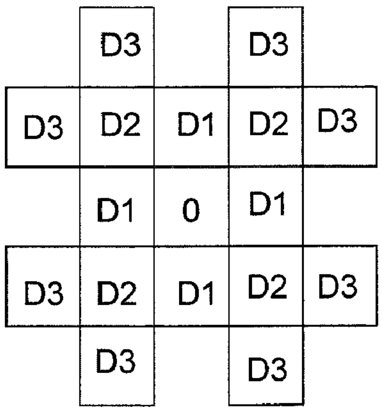
FIG. 1 represents an exemplary chamfer mask that can be used by a propagation distance transform.

As shown in FIG. 1, a chamfer mask takes the form of a table with a cell arrangement reproducing the pattern of a pixel surrounded by its near neighbors. In the center of the pattern, a cell assigned the value 0 identifies the pixel taken as the origin of the distances listed in the table. Around this central cell, there are peripheral cells filled with non-zero proximity distance values and reproducing the layout of the pixels in the vicinity of a pixel assumed to occupy the central cell. The proximity distance value given in a peripheral cell is that of the distance separating a pixel occupying the position of the peripheral cell concerned, from a pixel occupying the position of the central cell. It will be noted that the proximity distance values are distributed in concentric circles. A first circle of four cells corresponding to the four first-rank pixels, which are the closest to the pixel of the central cell, either on the same line or on the same column, are assigned a proximity distance value D1. A second circle of four cells corresponding to the four second-rank pixels, which are the pixels closest to the pixel of the central cell placed on the diagonals, are assigned a proximity distance value D2. A third circle of eight cells corresponding to the eight third-rank pixels, which are the closest to the pixel of the central cell while remaining outside of the row, the column and the diagonals occupied by the pixel of the central cell, are assigned a proximity distance value D3.

The chamfer mask can cover a more or less extensive vicinity from the pixel of the central cell by listing the values of the proximity distances of a greater or lesser number of concentric circles of neighboring pixels. It can be reduced to the first two circles formed by the neighboring pixels of a pixel occupying the central cell or be extended beyond the first three circles formed by the neighboring pixels of the pixel of the central cell. It is usual to stop at the first three circles as for the chamfer mask shown in FIG. 3.

The values of the proximity distances D1, D2, D3 which correspond to Euclidian distances are expressed in a scale, the multiplying factor of which allows the use of integer numbers at the cost of a degree of approximation. Thus, G. Borgefors adopts a scale corresponding to a multiplying factor of 3 or 5. In the case of a chamfer mask reproducing the first two circles of proximity distance values, therefore of dimensions 3×3, G. Borgefors gives the value 3 to the first proximity distance D1 which corresponds to an x- or y-axis level and also to the scale multiplying factor, and the value 4 to the second proximity distance which corresponds to the root of the sum of the squares of the x- and y-axis levels $\sqrt{x^2+y^2}$. In the case of a chamfer mask retaining the first three circles, therefore of dimensions 5×5, it gives the value 5 to the distance D1 which corresponds to the scale multiplying factor, the value 7, which is an approximation of $5\sqrt{2}$, to the distance D2 and the value 11, which is an approximation of $5\sqrt{5}$, to the distance D3.

The progressive construction of the shortest possible path going to a target pixel starting from source pixels and following the mesh of the pixels is done by a regular scan of the pixels of the image by means of the chamfer mask.

Initially, the pixels of the image are assigned an infinite distance value, in fact a number that is high enough to exceed all the measurable distance values in the image, except for the source pixel or pixels which are assigned a zero distance value. Then, the initial distance values assigned to the target points are updated while the image is being scanned by the chamfer mask, the update consisting in replacing a distance value assigned to a target point with a new lower value resulting from a distance estimation made on a new application of the chamfer mask to the target point concerned.

A distance estimation by application of the chamfer mask to a target pixel entails listing all the paths going from this target pixel to the source pixel via a neighboring pixel of the target pixel for which the distance has already been estimated during the same scan, searching among the listed paths for the shortest path or paths and adopting the length of the shortest path or paths as the distance estimation. This is done by placing the target pixel for which the distance is to be estimated in the central cell of the chamfer mask, selecting the peripheral cells of the chamfer mask that correspond to neighboring pixels for which the distance has just been updated, calculating the lengths of the shortest paths linking the target pixel to be updated to the source pixels via one of the selected neighboring pixels, adding the distance value assigned to the neighboring pixel concerned and the proximity distance value given by the chamfer mask, and adopting, as the distance estimation, the minimum of the path length values obtained and the old distance value assigned to the pixel currently being analyzed.

At the level of a pixel being analyzed by the chamfer mask, the progressive search for the shortest possible paths starting from a source pixel and going to the various target pixels of the image gives rise to a phenomenon of propagation toward the pixels which are the closest neighbors of the pixel being analyzed and for which the distances are listed in the chamfer mask. In the case of a regular distribution of the pixels of the image, the directions of the closest neighbors of a pixel that do not vary are considered as propagation axes of the chamfer mask distance transform.

The order of scanning of the pixels of the image influences the reliability of the distance estimations and their updates, because the paths taken into account depend thereon. In fact, it is subject to a regularity constraint which means that, if the pixels of the image are identified in lexicographic order (pixels arranged in an ascending order row by row, starting from the top of the image and working toward the bottom of the image, and from left to right within a row), and if a pixel p has been analyzed before a pixel q, then a pixel p+x must be analyzed before the pixel q+x. The lexicographic, reverse lexicographic (scanning of the pixels of the image row by row from bottom to top and, within a row, from right to left), transposed lexicographic (scanning of the pixels of the image column by column from left to right and, within a column, from top to bottom), inverse transposed lexicographic (scanning of the pixels in columns from right to left and, within a column, from bottom to top) orders satisfy this condition of regularity and, more generally, all the scans in which the rows and columns are scanned from right to left or from left to right. G. Borgefors recommends a double scan of the pixels of the image, once in lexicographic order and then in reverse lexicographic order.

Analyzing the image by means of the chamfer mask can be done according to a parallel method or a sequential method. For the parallel method, the distance propagations are considered from all the points of the mask that is passed over all of the image in several scans until there are no more changes in the distance estimations. For the sequential method, only the distance propagations from half the points of the mask are considered. The top half of the mask is passed over all the points of the image by a scan in lexicographic order and then the bottom half of the mask is passed over all the points of the image in reverse lexicographic order.

Figure 2A:
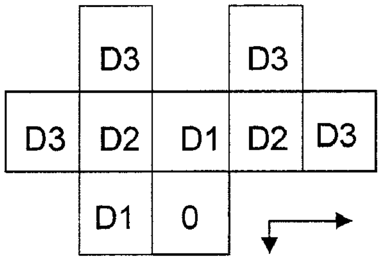
FIGS. 2*a* and 2*b* show cells of the chamfer mask illustrated in FIG. 2 used in scan passes in forward and reverse lexicographic orders.

FIG. 2*a* shows, in the case of the sequential method and of a scan pass in lexicographic order going from the top left corner to the bottom right corner of the image, the cells of the chamfer mask of FIG. 1 used to list the paths going from a target pixel placed in the central cell (cell indexed 0) to the source pixel, via a neighboring pixel, the distance of which has already been the subject of an estimation during the same scan. There are eight of these cells, arranged in the top left part of the chamfer mask. There are therefore eight paths listed for the search for the shortest, the length of which is taken for the distance estimation.

Figure 2B:
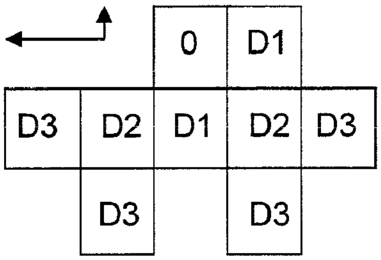

FIG. 2*b* shows, in the case of the sequential method and of a scan pass in reverse lexicographic order going from the bottom right corner to the top left corner of the image, the cells of the chamfer mask of FIG. 1 used to list the paths going from a target pixel placed in the central cell (cell indexed 0) to the source pixel via a neighboring pixel, the distance of which has already been the subject of an estimation during the same scan. These cells complement those of FIG. 2*a*. There are also eight of them, but arranged in the bottom right part of the chamfer mask. There are therefore eight more paths listed for the search for the shortest, the length of which is taken for the distance estimation.

The propagation distance transform whose principle has just been briefly reviewed was originally devised for analyzing the positioning of objects in an image, but it was soon to be applied to the estimation of distances on a map of the relief taken from a terrain elevation database with regular meshing of the Earth's surface. In practise, such a map does not explicitly have a metric, since it is plotted from the elevations of the points of the mesh of a terrain elevation database of the zone represented. In this context, the chamfer mask distance transform is applied to an image whose pixels are the elements of the elevation database of the terrain belonging to the map, that is, elevation values associated with the geographic latitude and longitude coordinates of the nodes of the mesh of the geographic location grid used for the measurements, arranged, as on the map, by latitude and by longitude, increasing or decreasing according to a two-dimensional table of latitude and longitude coordinates.

Some terrain navigation systems for mobiles such as robots use the chamfer mask distance transform to estimate curvilinear distances taking into account zones that cannot be crossed because of their broken configurations. To do this, they associate, with the elements of the elevation database of the terrain included in the map, a prohibited zone attribute which signals, when activated, an uncrossable or prohibited zone and inhibits any update, other than an initialization, of the distance estimation made by the chamfer mask distance transform.

In the case of an aircraft, the adoption of a prohibited zone attribute is inappropriate because the configuration of the uncrossable zones changes according to the altitude resulting from following the vertical profile of its path. To overcome this difficulty, the applicant has proposed, in a French patent application FR 2.860.292, to have the distance transform propagate, over the points of the image made up of the elements of the terrain elevation database, not only the lengths of the shortest paths, called propagated distances, but also the altitudes that the aircraft would take after having traveled an intersecting path of minimum length by complying with its vertical flight and speed profile, called propagated altitudes, and to retain a propagated distance at a point only if the associated propagated altitude is greater than the elevation of the point concerned contained in the database, augmented by a vertical safety margin.

Overfly restrictions prescribed by the air regulations are taken into account by means of specific regulatory constraint attributes identifying, at each point, the requirements of the air regulation—overfly prohibition, minimum overfly height or altitude allowed, authorized altitude blocks, heading or gradient constraint—which must also be satisfied for the propagated distance at a point to be retained. These air regulation constraint attributes can be entered periodically into the terrain elevation database according to planned periods of validity of the regulation or when preparing a flight plan. They can also be downloaded dynamically into an onboard terrain elevation database, for the regions located in the vicinity of the predictable route of the aircraft.

Ultimately, the implementation of a propagation distance transform in the field of air navigation, more generally the creation of a curvilinear distance map, must be done by taking into account static constraints consisting of the relief and/or regulated traffic zones, and an altitude variation law that is a function of the distance traveled which is a dynamic constraint which can be determined from the estimated distance from the point taken as the origin of the measurements and which often results from a prescribed vertical flight and speed profile.

The determination, in horizontal projection, of an air route between a departure point and a destination point by means of curvilinear distance maps raises various problems, including:

- the charting of the shortest direct curvilinear path or paths corresponding to the curvilinear distance estimation associated with the destination point because they do not explicitly appear in a curvilinear distance map,
- the incomplete knowledge of a vertical flight and speed profile when it consists of two parts, one defined from the departure point and the other from the destination point, because the latter depends on the length of the path ultimately adopted,
- the adaptations to be made to the profile of a direct curvilinear path based on a curvilinear distance estimation of the destination point for it to be flyable, that is, adapted to the maneuvering conditions imposed on an aircraft, and
- the locations of the check- and/or turn points "D-Fix" that make it possible to follow, in manual or automatic piloting mode, the direct curvilinear path made flyable.

The charting of a direct curvilinear path corresponding to the or one of the shortest paths on which is based the curvilinear distance estimation made for the destination point in a curvilinear distance map created without taking into account dynamic constraints and having the departure point as the origin of its distance measurements can be obtained by creating a second and a third curvilinear distance map covering the same region. The second map is differentiated from the first by the fact that the point taken as the origin of the curvilinear distance measurements is shifted to the target point. The third map adopts, for the curvilinear distance estimation at each of its points, the sum of the curvilinear distance estimations made for the point concerned, in the first and second maps.

In effect, when there is a direct curvilinear path of minimum length, which is the case with a destination point provided with a curvilinear distance estimation, the points of the third curvilinear distance map, followed by the direct curvilinear path, form an uninterrupted string of points going from the departure point to the destination point, all assigned the minimum sum of curvilinear distance estimations because, if that were not the case, there would be a shorter path, which is not possible by definition. Since there can be several paths of minimum length leading from the departure point to the destination point, the string of points can be contained in a larger set of connected points, all assigned a minimum sum of curvilinear distance estimations, having the form of a sequence of parallelogram-shaped surfaces giving different possibilities for plotting a path of minimum length. In this case, the least sinuous plot following the diagonals of the parallelogram forms is adopted.

When the curvilinear distance map having the departure point as the origin of the distance measurements is created by taking into account dynamic constraints, the previous method of charting a direct curvilinear path raises a problem of implementation because there is no reason why the dynamic constraints that can be determined from one point should be determinable from another point. Thus, it is often possible in the second map to comply with the dynamic constraints applied to the first map. To overcome this difficulty, when creating the second curvilinear distance map, the static and dynamic constraints taken into account on creating the initial curvilinear distance map are replaced by a set of zones to be circumnavigated consisting of points of the first map where a curvilinear distance estimation proved impossible because of the various constraints.

When climbing to a cruising altitude from a mission departure point, every effort is made, for a transport aircraft, to optimize energy consumption, which is reflected in an irregular vertical flight and speed profile that is approximated by a series of rectilinear segments for it to be followed by a flight management computer or by an automatic pilot.

To simplify the description, the approximation is continued until the vertical flight profile on climbing to the cruising altitude from the departure point can be likened to a single rectilinear segment with constant gradient. The same simplification is made for the vertical flight profile on the descent from the cruising altitude toward the destination point when the aircraft must consume its potential and kinetic energies.

These simplifications are not restrictive because it is always possible to do without them in the various steps of the method of charting a direct curvilinear path which has just been described and to replace the single constant gradient rectilinear segments with the series of rectilinear segments that they approximate.

Figure 3:
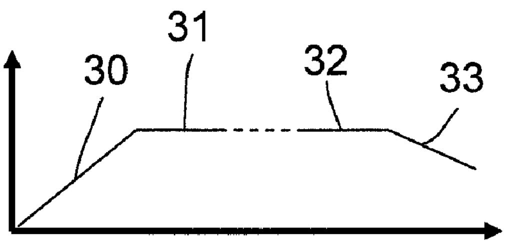
FIG. 3 illustrates a vertical flight profile with prescribed climb gradient from the departure point and descent gradient towards the destination point.

As shown in FIG. 3, the result, for a transport aircraft taking off from a runway of a departure airport to touch down on a runway of a destination airport, is a vertical flight profile comprising a climb 30 with constant gradient starting from the altitude of the point of departure to a cruising altitude followed by a level 31, 32 at the cruising altitude, then a descent 33 with constant gradient to the altitude of the destination point. In this case, the charting of a direct curvilinear path leading from the departure point to the destination point is obtained by breaking down the vertical flight and speed profile into a go profile shown in FIG. 4*a* and a return profile shown in FIG. 4*b*.

Figure 4A:
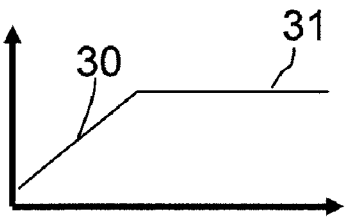
FIGS. 4*a* and 4*b* illustrate a breakdown of the vertical flight profile shown in FIG. 3 into a go profile and a return profile in order to enable it to be used to chart a direct curvilinear path between the departure point and the destination point of a flight plan air route for which the horizontal profile is to be established.

The go profile shown in FIG. 4*a* consists of the climb 30 with constant gradient from the altitude of the departure point to the cruising altitude, prolonged indefinitely by the cruising altitude level 31. It corresponds to a dynamic constraint that can be determined from the departure point, that can be used to create an outline first curvilinear distance map that is faithful to the start of the path alone since this dynamic constraint takes into account only the first half of the prescribed vertical flight and speed profile.

Figure 4B:
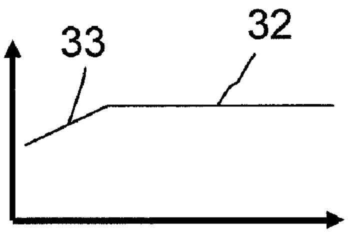

The return profile, shown in reverse order in FIG. 4*b*, comprises the level 32 at cruising altitude, continued by the descent 33 with constant gradient to the destination point. It corresponds to a dynamic constraint that can be determined from the destination point, that can be used to create an outline second curvilinear distance map that is faithful to the end of the path alone since this dynamic constraint takes into account only the second half of the prescribed vertical flight and speed profile.

Figure 5:
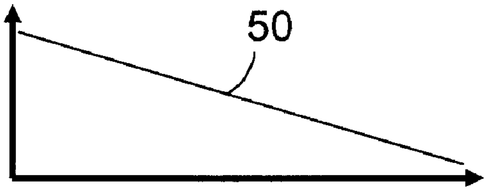
FIG. 5 illustrates a vertical flight profile with constant descent gradient to the destination point.
Figure 6A:
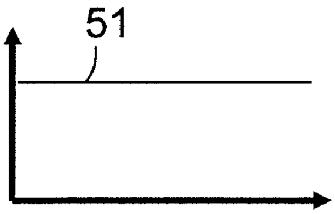
FIGS. 6*a* and 6*b* illustrate a breakdown of the vertical flight profile shown in FIG. 5 into a go profile and return profile in order to enable it to be used to chart a direct curvilinear path between the departure point and the destination point of a flight plan air route for which the horizontal profile is to be established.
Figure 6B:
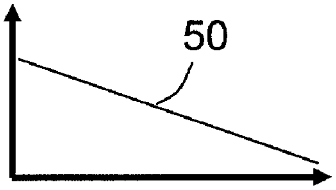

In the case where the aircraft only descends, as shown by 50 in FIG. 5, the shortest path leading from the departure point to the destination point is plotted by breaking down the vertical flight and speed profile into a degenerate go profile shown in FIG. 6*a* consisting of a single level 51 at cruising altitude corresponding to an absence of dynamic constraint and into a return profile shown in reverse order in FIG. 6*b*, consisting of a descent 50 with constant gradient to the destination point.

To make the two outline first and second maps created with different vertical flight and speed profiles compatible, they are updated, consisting in recreating them by replacing the static and dynamic constraints with a set of obstacles to be circumnavigated consisting of points of the outlines where a curvilinear distance estimation has proved impossible. The process of charting a direct curvilinear path then continues with the creation of a third curvilinear distance map containing the sums of the curvilinear distance estimations of the updates of the first two maps and with the plotting of a path linking the departure point to the destination point within a connected set of points assigned a minimum sum of curvilinear distance estimations.

It will be noted that the process of charting a direct curvilinear path is simplified in the case where the aircraft only descends to its destination point because it is then possible to skip the outline first curvilinear distance map and the updating of the second curvilinear distance map. The same simplification occurs each time there is no prescribed vertical flight and speed profile on departure. A simplification of the same kind also occurs when there is no prescribed vertical flight and speed profile on arrival, because it is then possible to skip the outline second curvilinear distance map and the updating of the first curvilinear distance map.

The set of zones to be circumnavigated used for updating the first and second curvilinear distance maps on charting a direct curvilinear path can go beyond points of the outline curvilinear distance maps for which it has not been possible to estimate curvilinear distances because finding sufficiently short paths could not be found and include the points of these outlines assigned curvilinear distance estimations having discontinuities compared to those assigned to the points in their close vicinity, because they correspond to reliefs that can be reached only by circuitous pathways. It can also be enlarged by a lateral safety margin in order to laterally distance the direct curvilinear path charted on the curvilinear distance maps from the circumnavigated reliefs. The thickness of this lateral safety margin, which serves to prevent the lateral maneuvering freedom of an aircraft from being limited due to the proximity of a relief, can be defined in various ways:

It can have an arbitrarily fixed constant value that is a function of the flat turn capabilities of the aircraft or its agility.

It can have a value that is a function both of the flat turn capabilities of the aircraft and of the speed law associated with the prescribed vertical flight and speed profile. Thus, the safety margins are reduced when the aircraft flies slowly (take-off and landing) and increase when the aircraft is cruising close to the relief.

It can even depend on the change of heading needed to circumnavigate an obstacle.

The thickness in the horizontal plane of the lateral safety margin can be taken to be equal to the minimum flat turn radius, which is imposed on the aircraft according to its performance characteristics, the desired comfort and its air speed TAS, taking into account or not taking into account local wind.

In the absence of local wind, the minimum flat turn radius R satisfies the conventional relation:

$$R = \frac{TAS^2}{g \cdot \tan\varphi_{roll}}$$

$\phi_{roll}$ being a maximum roll angle and g being the acceleration of gravity.

Local wind modifies the apparent radius of a flat turn by increasing it when it comes from the side opposite to the turn or from behind and by reducing it when it comes from the side inside the turn or from the front. The apparent radius can be likened to half the transverse distance, relative to the aircraft, to the point of the turn where the aircraft will reach a change of heading of 180°. This transverse distance satisfies the relation:

$$x_t(t_{W1}) = WS_{Xt} \cdot t_{W1} - \delta \cdot R \cdot \cos(w t_{W1} + \gamma_t) + \delta \cdot R \cdot \cos(\gamma_t)$$

with $$t_{W1} = \frac{1}{w}\left[\arcsin\left(-\delta \frac{WS_{Xt}}{TAS} - \gamma_t\right) + 2k \cdot \prod\right]$$

$$\gamma_t = -\delta \cdot (\text{Track} - \text{Heading})$$

$$w = \frac{TAS}{R} = \frac{g \cdot \tan\varphi_{roll}}{TAS}$$

$WS_{Xt}$ being the transverse component of the local wind,

γ being a factor dependent on the initial conditions,

δ being a coefficient equal to +1 for a right turn and −1 for a left turn.

For a justification of this relation, reference can be made to the description of the French patent application FR 2.871.878 filed by the applicant.

While being dependent on a minimum flat turn radius R, the thickness in the horizontal plane of the lateral margin can be made dependent on the change of heading needed to circumnavigate, for example, as described in the French patent application filed by the applicant on 24 Sep. 2004 under the number 04 10149, by making it depend, at a point of the contour of an obstacle to be circumnavigated, on a scale coefficient (1+sin ⌊min(|bearing|,π/2)⌋), bearing being the angle between the normal at the relevant point of the contour and the tangent to the path.

FIGS. 7, 8, 9, 11, 12 and 14 illustrate the various steps of a process of charting a direct curvilinear path complying with vertical flight and speed profiles prescribed on departure and on arrival implemented from an image of the reliefs and regulated overfly zones of a region flown over by an aircraft, the pixels of which correspond to a meshing of the region flown over with a geographic location grid which can be:

- a grid that is regular in distance, aligned on the meridians and parallels,
- a grid that is regular in distance, aligned on the heading of the aircraft,
- a grid that is regular in distance, aligned on the route of the aircraft,
- a grid that is angularly regular, aligned on the meridians and parallels,
- a grid that is angularly regular, aligned on the heading of the aircraft,
- a grid that is angularly regular, aligned on the route of the aircraft,
- a polar (radial) representation centered on the aircraft and its heading,
- a polar (radial) representation centered on the aircraft and its route.

Typically, the grid reproduces a four-sided polygonal pattern, conventionally squares or rectangles; it can also reproduce other polygonal patterns such as triangles or hexagons.

Figure 7:
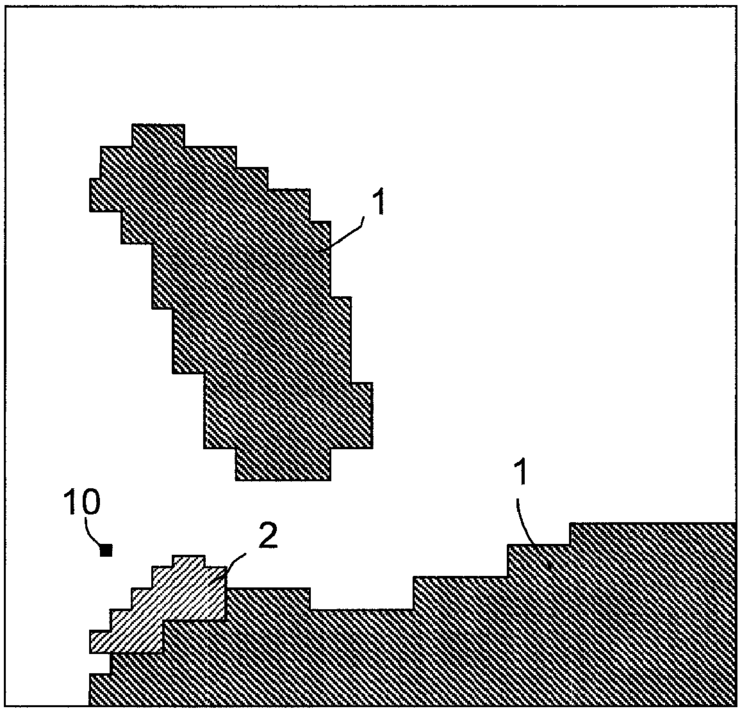
FIG. 7 represents an exemplary set of obstacles to be circumnavigated obtained from an outline curvilinear distance map having as the origin of the distance measurements the departure point of the flight plan route and taking into account a vertical flight and speed profile prescribed on departure.

FIG. 7 shows the sets 1 of points where a curvilinear distance estimation has proved impossible and the sets 2 of points where discontinuities appear between the curvilinear distance estimations for neighboring points which emerge, in the first step of the process of path plotting, on creation of the first outline curvilinear distance map by application to the image of the region flown over, of a chamfer mask distance transform having, as the origin of the distance measurements, the departure point 10 of the path and complying with static constraints consisting of the relief and/or regulated traffic zones and dynamic constraints consisting of a prescribed altitude according to the distance traveled from the departure point 10 of the path corresponding to the go profile part (FIG. 4*a*) of a vertical flight and speed profile (climb from the departure point to the cruising flight altitude prolonged indefinitely by a level).

The sets 1 of points where a curvilinear distance estimation has proved impossible because the chamfer mask distance transform could not find a path leading thereto represent the zones to be circumnavigated because they are inaccessible to the aircraft if it wants to comply with the go profile part (FIG. 4*a*) of the prescribed vertical flight and speed profile.

The sets 2 of points where discontinuities appear between the curvilinear distance estimations for neighboring points indicate reliefs that cannot be reached directly and are therefore to be circumnavigated.

Figure 8:
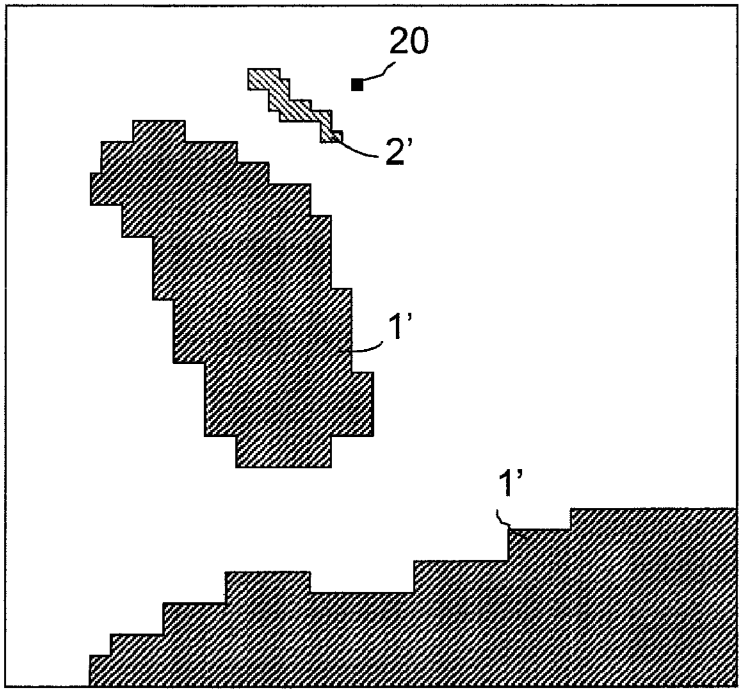
FIG. 8 represents the obstacles to be circumnavigated obtained in the same context as FIG. 7, from an outline curvilinear distance map having as the origin of the distance measurements the destination point of the flight plan route and taking into account a vertical flight and speed profile prescribed on arrival.

FIG. 8 shows the sets 1' of points where a curvilinear distance estimation has proved impossible and the sets 2' of points where discontinuities appear between the curvilinear distance estimations for neighboring points which emerge, in the second step of the process of path plotting, on creation of the second outline curvilinear distance map by application to the image of the region flown over, of a chamfer mask distance transform having, as the origin of the distance measurements, the destination point 20 of the path and complying with the same static constraints as the first outline, consisting of the relief and/or of regulated traffic zones and dynamic constraints consisting of a prescribed altitude that is a function of the distance traveled from the destination point of the path corresponding to the return profile part (FIG. 4*b*) of the vertical flight and speed profile (level at the cruising flight altitude followed by a descent on approach to the destination point).

Figure 9:
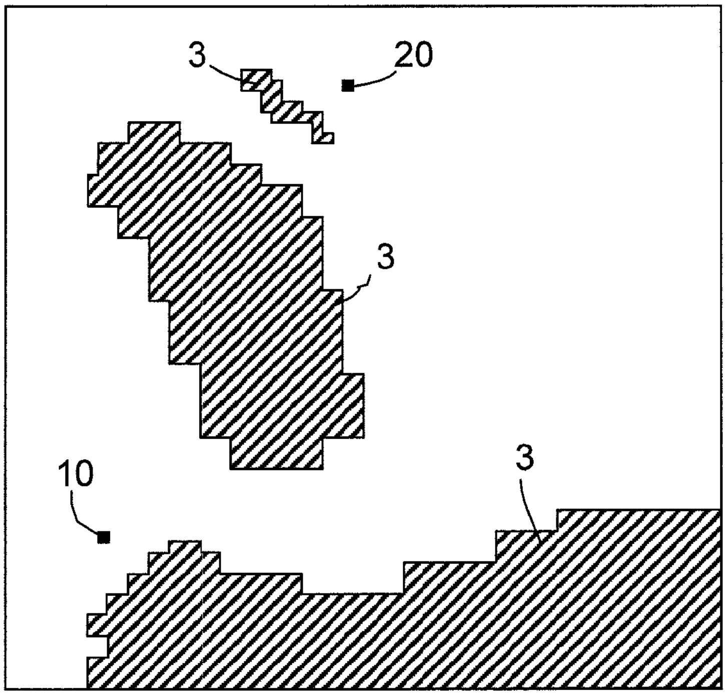
FIG. 9 represents the set of obstacles to be circumnavigated resulting from the combinatory merging of the sets of obstacles to be circumnavigated shown in FIGS. 7 and 8, FIGS. 10*a*, 10*b*, 10*c* illustrate a method of plotting a lateral safety margin around an obstacle to be circumnavigated.

FIG. 9 shows the combinatory merging 3 of the obstacles to be circumnavigated appearing in the two outlines (sets 1, 1' of points where a curvilinear distance estimation has proved impossible and sets 2, 2' of points where discontinuities appear between curvilinear distance estimations for adjacent points).

Figure 10A:
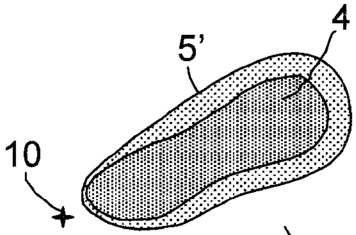
Figure 10B:
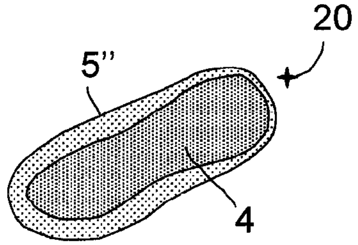
Figure 10C:
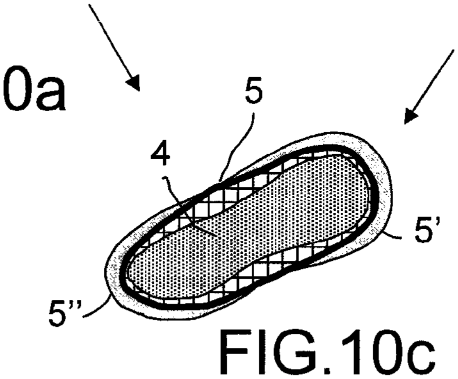

FIGS. 10*a*, 10*b* and 10*c* illustrate the enlargement of an obstacle 4 to be circumnavigated by lateral safety margins taking into account the limitation on the lateral maneuver freedom of the aircraft in the vicinity of this obstacle 4. This enlargement is obtained by plotting the margins based on iso-distance lines plotted outside the contours of the obstacle 4, for example, using a chamfer mask distance transform applied to the image of the region flown over with the obstacles to be circumnavigated taken as the origin of the distance measurements as is described in the French patent application FR 2.864.312 filed by the applicant. It was assumed here that the lateral margins depended on the speed of the aircraft in the vicinity of the obstacles 4 to be circumnavigated. They are plotted in a number of steps:

A first step illustrated by FIG. 10*a* consists in plotting, around the obstacle 4 to be circumnavigated, a lateral protection margin 5' that is a function of the speed law associated with the go profile (FIG. 4*a*) of the vertical flight and speed profile. The lateral margin 5' is less thick in the vicinity of the departure point 10 because the aircraft accelerates progressively until it reaches its cruising speed.

A second step illustrated by FIG. 10*b* consists in plotting, around the obstacle 4 to be circumnavigated, a lateral protection margin 5" that is a function of the speed law associated with the return profile (FIG. 4*b*) of the vertical flight and speed profile. The lateral margin 5" is less thick in the vicinity of the destination point 20 because the aircraft decelerates with a view to imminent landing.

A third step illustrated by FIG. 10*c* consists in determining the final lateral margin 5 by merging, by intersection, the lateral margins 5', 5" obtained during the preceding two steps.

Figure 11:
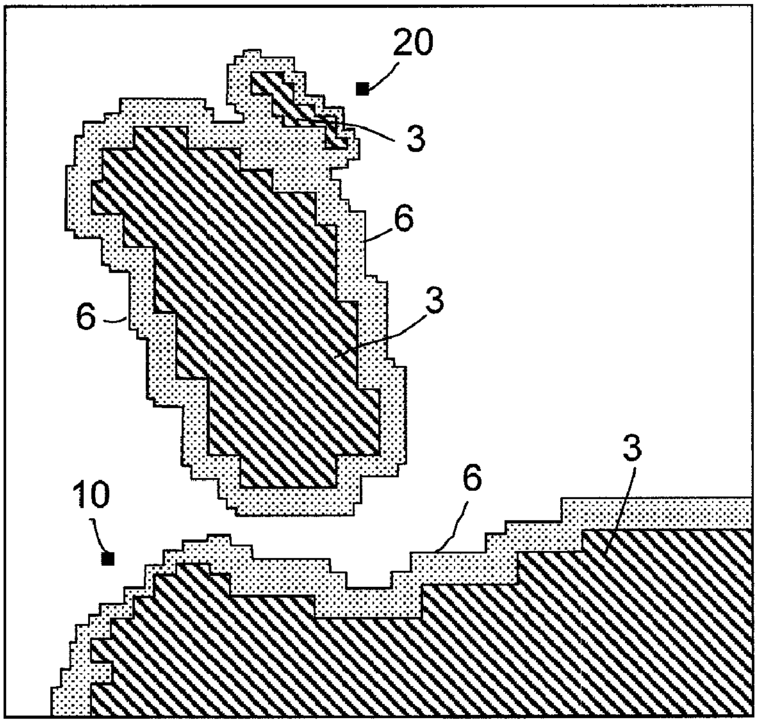
FIG. 11 represents, in the same context as FIGS. 7 and 8, the set of obstacles to be circumnavigated, enlarged by lateral safety margins, taken into account for the curvilinear distance maps used to chart the direct path between the departure point and the destination point.

FIG. 11 shows the enlargement, by a lateral safety margin 6, of the set of merged obstacles 3 resulting from the first and second outline curvilinear distance maps. The lateral margin 6 is thinner around the departure point 10 and destination point 20 because of the reduced speed of the aircraft.

Figure 12:
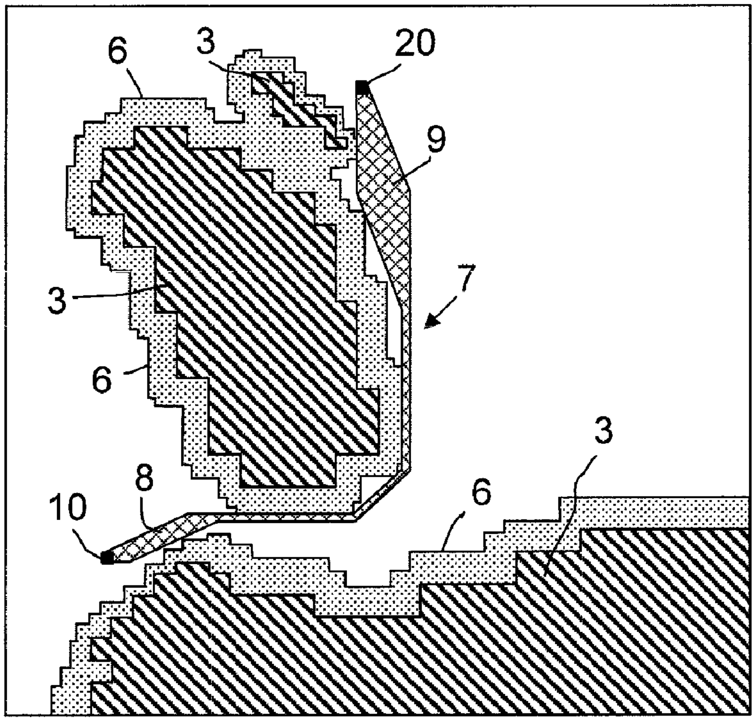
FIG. 12 represents a set of shortest path points identified in the context of FIGS. 7, 8 and 11.

FIG. 12 shows the plot of a set of points of the shortest paths obtained after:

updating of the outline first curvilinear distance map having the departure point 10 as the origin of the distance measurements, by application, to the image of the region flown over, of a chamfer mask distance transform having the departure point 10 of the path as the origin of the distance measurements and, as constraints, the set 3 of obstacles to be circumnavigated, merged and enlarged by the lateral safety margin 6, updating of the outline curvilinear distance map having the destination point 20 as the origin of the distance measurements, by application, to the image of the region flown over, of a chamfer mask distance transform having the destination point 20 of the path as the origin of the distance measurements and, as constraints, the set 3 of obstacles to be circumnavigated, merged and enlarged by the lateral safety margin 6, creation of a third curvilinear distance map adopting, for curvilinear distance estimation at each of its points, the sum of the curvilinear distance estimations made for the point concerned, and charting of the connected set 7 of the points assigned, in the third curvilinear distance map, a minimal curvilinear distance estimation and joining the departure point 10 to the destination point 20.

The set 7 of the points of the shortest paths takes the form of an uninterrupted chain of points thickening in the vicinities of the departure and destination points to take the forms 8, 9 of parallelograms.

Figure 13:
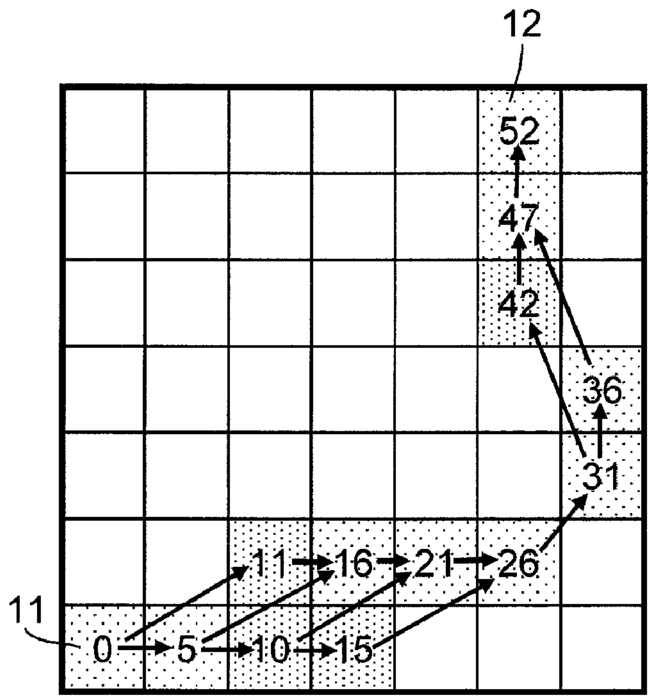
FIG. 13 represents an exemplary set of shortest path points showing that the fact that a path belongs to it does not guarantee that it is minimal.

FIG. 13 represents, on the location grid of a curvilinear distance map, a set of points of the shortest paths between a departure point 11 and a destination point 12 with, for each point or cell of the geographic location grid forming part of the set, the evaluated estimation of the curvilinear distance from the departure point 11 and a background with a pattern dependent on the number of paths of minimum length used by the propagation distance transform supplying the curvilinear distance estimations. The background with the lightest pattern is assigned to the cells taken by a single path of minimum length and the background with the densest pattern is assigned to the cells taken by two paths of minimum length. FIG. 13 shows that the simple fact that a path has all its points belonging to the set of the points of the shortest paths does not guarantee that it is of minimum length. Only the paths that follow the arrows are appropriate.

Figure 14:
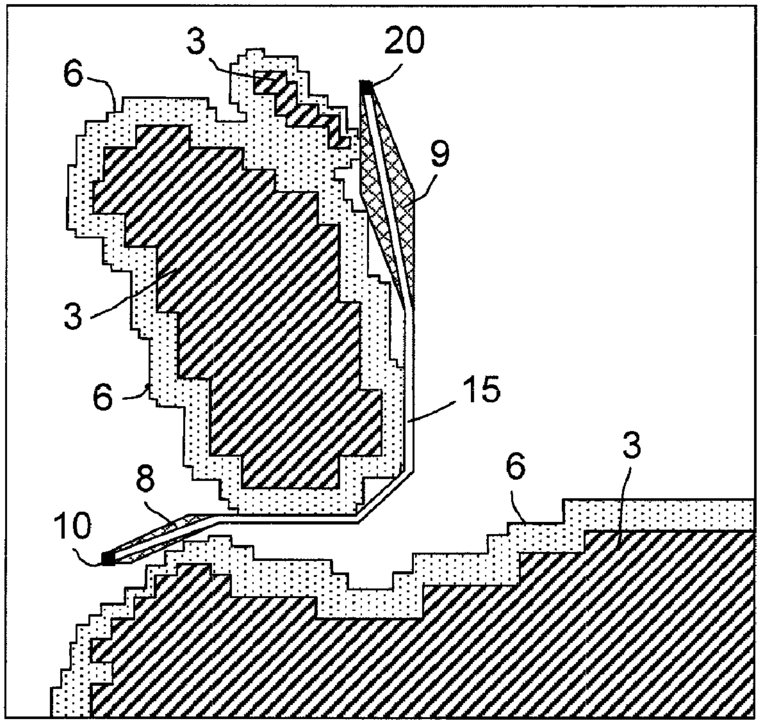
FIG. 14 represents the direct curvilinear path obtained relative to the set of obstacles to be circumnavigated shown in FIG. 11.

FIG. 14 shows the direct curvilinear path 15 ultimately adopted taking into account the reliefs, the regulated overfly zones and the vertical flight and speed profile to be complied with. It follows the diagonals of the parallelogram shapes 8, 9.

There remains to be defined a path that can be flown by a succession of check- and/or turn points "D-Fix" defining, with their associated constraints, a sequence of rectilinear segments "D-Legs" with transitions rounded to the nearest unit by turns with radii that are a function of the current speed of the aircraft, approaching the direct curvilinear path while not encroaching on the set of the merged obstacles and their lateral protection margins, by reducing as far as possible the frequency of the changes of heading and by taking into account the path smoothing applied automatically by a flight management computer on a transition between two or more rectilinear segments "D-Legs".

To ensure that the direct curvilinear path is followed as closely as possible, the rectilinear segments "D-Legs" have a maximum deviation relative to the points of the direct curvilinear path that they short-circuit imposed on them.

One way of determining the rectilinear segments "D-Legs" of the flyable path is to construct them progressively, starting from the departure or arrival point by adding, one by one, points of the direct curvilinear path to the block of consecutive points of the segment being constructed until it encroaches on the lateral margin of an obstacle to be circumnavigated or its distance at one of the points of the direct curvilinear path that it short-circuits reaches the maximum deviation allowed. The segment being constructed is then considered to be finished and the construction of the next segment begun, until the arrival or departure point is reached. The sequence of rectilinear segments "D-Legs" obtained is then smoothed in the way of the flight computer then once again compared to the contours of the obstacles to be circumnavigated complemented by the lateral safety margins. It is accepted if there is no encroachment and rejected otherwise. When the sequence of rectilinear segments "D-Legs" is rejected because of encroachments on the lateral safety margins, it must be distanced from the margins at the levels of the encroachments. One way of proceeding is to rechart the direct curvilinear path with lateral safety margins locally augmented in line with the encroachments and only for this charting, then to proceed with a new determination of the sequence of rectilinear segments "D-Legs".

Once a sequence of rectilinear segments "D-Legs" is accepted for definition of the flyable path, the intersection points of the consecutive rectilinear segments "D-Legs" are taken as check- and/or turn points "D-Fix", associated with the flight constraints imposed by compliance with the vertical flight and speed profile at their levels.

Figure 15:
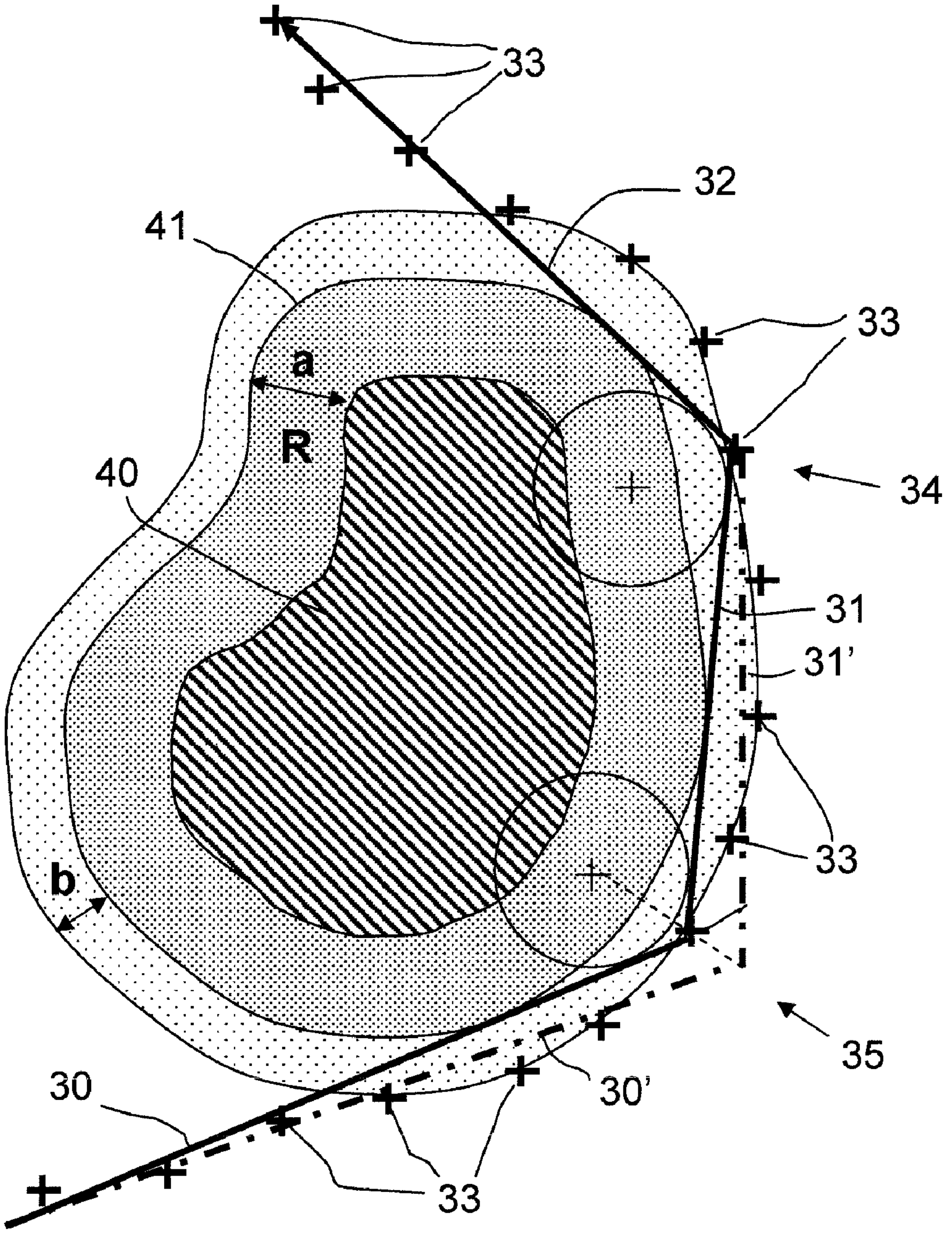
FIG. 15 illustrates a method of determining a sequence of rectilinear segments approximating the plot of a direct curvilinear path.

FIG. 15 illustrates the determination of the rectilinear segments "D-Legs" 30, 31, 32 of the sequence and consequently of the check- and/or turn points "D-Fix" from the direct curvilinear path formed by a string of points 33 circumnavigating an obstacle 40 surrounded by a lateral safety margin 41 with a thickness "a" corresponding to the minimum turn radius R of the aircraft. For this determination, the maximum deviation "b" of the segments relative to the points 33 of the direct curvilinear path has been set at half the thickness "a" of the lateral safety margin 41.

To plot the rectilinear segments "D-Legs", it is possible to try to replace, in the string of points 33 of the direct curvilinear path, as many consecutive points as possible with rectilinear segments that satisfy the condition of maximum deviation "b". This can be done by the gradual construction method described previously. The departure point or, respectively, the destination point of the direct path is taken as the origin of the first segment that is enlarged by adding, one by one, consecutive points 40 as long as it does not penetrate into an obstacle expanded by the safety margin and its deviation (the maximum length of the projections on the segment, of the short-circuited points 40) complies with the maximum deviation allowed. If the destination point or, respectively, departure point of the direct path is not reached, the end point of the first segment is taken as the origin of a second rectilinear segment that is enlarged, and so on.

This progressive construction method allows variants, such as, for example, a dichotomic method consisting in:

- initially adopting a rectilinear segment linking the departure and destination points of the direct curvilinear plot,
- if this segment penetrates into an obstacle expanded by the lateral safety margin or if it does not comply with the maximum deviation allowed, identifying the point of the direct curvilinear plot that is furthest away,
- replacing the preceding rectilinear segment with two rectilinear segments passing through the point of the direct curvilinear plot that is furthest away, and
- recommencing the same operations on each of the new segments until a string of rectilinear segments is obtained that circumnavigates the obstacles and their lateral safety margins and complies with the maximum deviation allowed.

FIG. 15 shows the rectilinear segments 30, 31, 32 obtained by application of the progressive construction method.

Once a string of rectilinear segments "D-Legs" is obtained, a check is made to ensure that the transitions between rectilinear segments are flyable, that is, can be achieved by turns with the minimum acceptable radius R circumnavigating the obstacles and their lateral safety margins.

In the event of a transition problem, the point at the intersection of the two rectilinear segments concerned is distanced by a certain pitch from the lateral safety margin, the integrity of which has been compromised and the two new rectilinear segments obtained are checked as to their compliance with the circumnavigation of the obstacles and their safety margins. In the event of noncompliance with the circumnavigation of the obstacles and their safety margins because of the existence of another nearby obstacle, the construction of the segments is repeated either, in the case of the progressive construction method, by shortening the rectilinear segment whose transition is the end point, or, in the case of the dichotomic method, by dividing up this rectilinear segment. It is also possible to completely recommence the construction of the rectilinear segments with a change of method or even, as indicated previously, to resume the process at the step where the direct curvilinear path is charted after having locally and temporarily enlarged the lateral safety margin.

In FIG. 15, the transitions 33 and 34 between the rectilinear segments 30, 31 and 32 are flyable because they can be achieved by turns with the minimum acceptable radius, without penetrating into the lateral safety margin. If this had not been the case at the transition 35, this transition 35 would have been, as shown, distanced from the lateral safety margin and the distorted rectilinear segments 30 and 31 in accordance with the rectilinear segments 30' and 31' shown by chain-dotted lines.

Once the sequence of rectilinear segments constructed on the direct path is accepted as a flyable path, the intersection points of the rectilinear segments are taken as check- and/or turn points "D-Fix" with, as associated constraints, the vertical flight and speed profiles.

Figure 16:
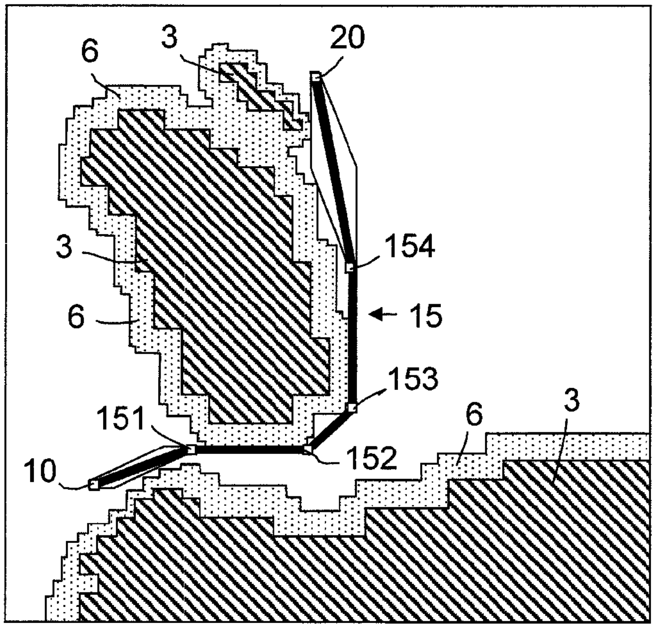
FIG. 16 illustrates the sequence of rectilinear segments and check-points "D-Fix" obtained from the direct path shown in FIG. 14.

FIG. 16 shows the check- and/or turn points "D-Fix" 151, 152, 153, 154 obtained from the direct curvilinear path 15 of FIG. 14.

Figure 17:
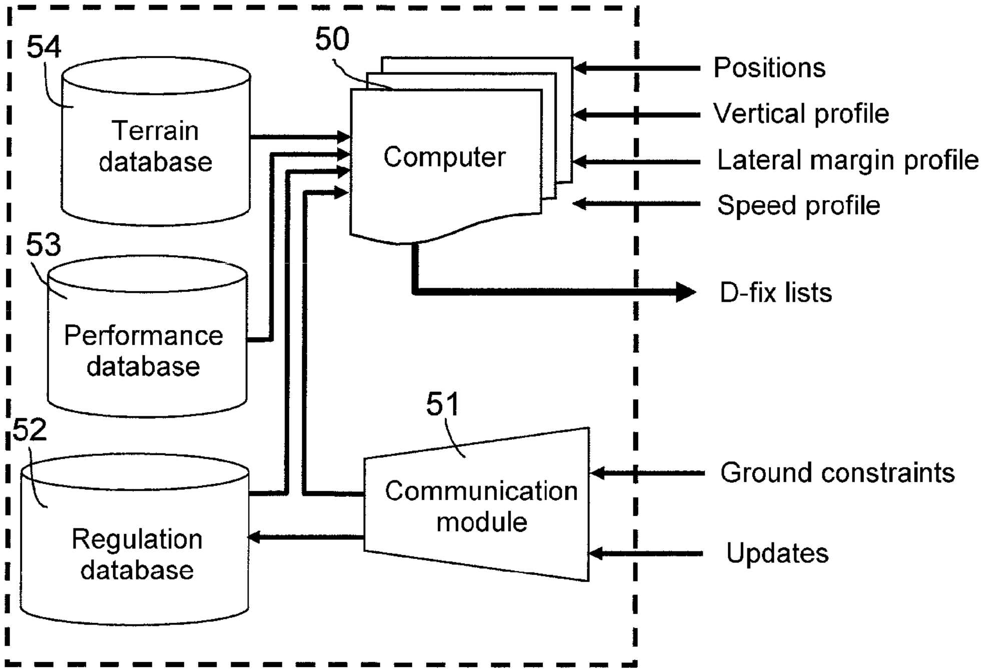
FIG. 17 represents a diagram of a device for implementing a method of determining the horizontal profile of a flight plan air route according to the invention.

FIG. 17 gives an exemplary architecture for a system implementing the lateral flight plan plotting method which has just been described. This system comprises:

- a computation and processing module 50 (CPU, memory, etc.),
- a communication module 51 responsible for receiving and storing data from the ground (prohibited overfly zones, weather, updates to the onboard databases, etc.),
- a database 52 of regulated or restricted air zones. This base can be updated dynamically by the communication module 51 (activation of certain regulated or restricted zones, movement of meteorological phenomena, displacement of prohibited overfly zones for tactical military zones, etc.),
- a database 53 of aircraft performance characteristics making it possible to establish the clearance capabilities of the aircraft and define the lateral margin profile according to flying speed and altitudes in the case where the lateral margins are not supplied by the onboard equipment of the aircraft located upstream, and
- a database 54 of elevations of the surrounding terrain.

Such a system for implementing the lateral flight plan plotting method can be used for different purposes. It can be used in a larger system for managing discontinuities in the flight plans, notably to reach a geographic point on a rendezvous request "Dir-to" by the crew to the flight management computer of the aircraft, to reach a fallback airport in the event of engine failure or to automatically reach predetermined positions for a drone or for a piloted aircraft in a security context.

On a "Dir-to" request made by the crew to the flight management computer of the aircraft, the latter, instead of trying to reach, by straight line, the geographic point designated by the crew, creates a vertical flight and speed plan and employs a lateral flight plan plotting system implementing the method described previously which submits to it a provisional flight plan taking into account the relief, the regulated overfly zones and the prescribed vertical flight and speed profile, and follows the provisional flight plan when the latter has received the approval of the crew.

Figure 18:
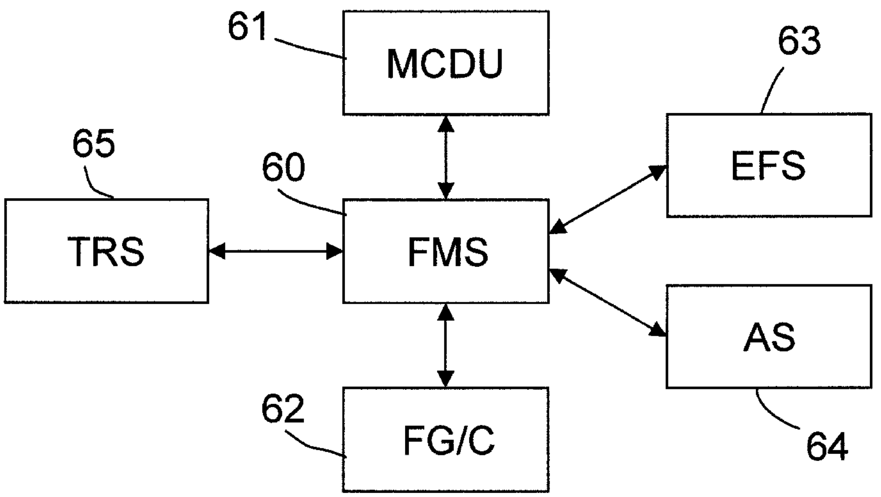
FIGS. 18 to 21 are diagrams of different onboard devices implementing a method of determining the horizontal profile of a flight plan air route according to the invention.

FIG. 18 shows the diagram of an onboard system for managing an engine failure in a functional environment on board an aircraft. This system imposes cooperation between a flight management computer 60 dialoging with the crew of the aircraft via a man-machine interface MCDU (Multipurpose Control Display Unit) 61 and acting on an FG/C (Flight Guidance and Control) automatic pilot 62 dedicated to maintaining the aircraft on its path and to monitoring its mobile surfaces, and an engine failure detector EFD 63 that can be part of a FADEC (Full Authority Digital Engine Control), with a system for choosing a fallback airport AS (Airport Selector) 64 and with a lateral flight plan plotting system TRS (Terrain Routing System) 65 implementing the method described previously.

The detection of an engine failure situation by the EFD 63 triggers the execution by the FMS computer 60 of an emergency landing procedure consisting in:

- involving the TRS 65 and AS 60 systems for the choice of an accessible fallback airport and of a check- and/or turn point "Waypoint" that is also accessible on entering an approach to this airport, compliant with a published official procedure, involvement of the MCDU 61 for a validation by the pilot, after possible modifications, of the choices of the fallback airport and of the approach procedure made by the TRS 65 and AS 60 systems, creating a vertical flight and speed profile for reaching the "Waypoint" giving access to the fallback airport, re-involving the TRS system 65 for the determination of a temporary flight plan to reach the access check- and/or turn point on approaching the fallback airport, re-involving the MCDU 61 for a validation by the pilot, after possible modifications, of the proposed route, and issuing instructions enabling the FG/C 62 to make the aircraft follow the paths compliant with the validated temporary flight plan.

Once transmitted to the flight management computer FMS 60, the check- and/or turn points "D-Fix" supplied by the lateral flight plan plotting system TRS 65 are considered to be conventional check- and/or turn points "Waypoints" in order to enable an operator to modify, move and delete them.

Figure 19:
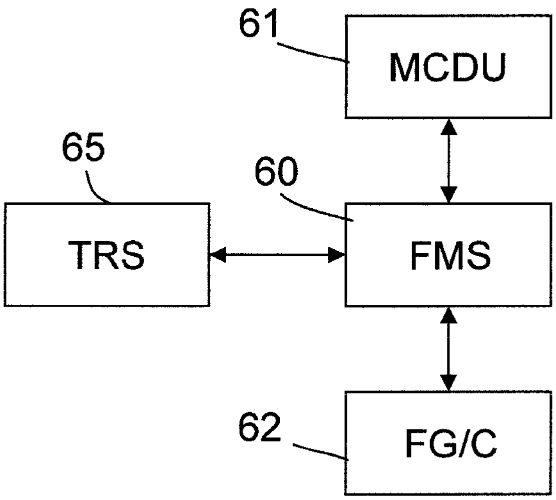

FIG. 19 shows the diagram of an onboard device for managing discontinuities in the flight plans in a functional environment on board an aircraft. It comprises the same elements as that of FIG. 18, apart from the engine failure detector EFD 63 and the system for choosing the fallback airport AS 64.

A flight management computer hands control to the pilot when it encounters a flight plan discontinuity in executing its function of automatically following a flight plan. In the absence of a system TRS 65, the pilot must take over the manual piloting on the path going from the check- and/or turn point "Waypoint" marking the start of the discontinuity to the check- and/or turn point "Waypoint" marking the end of the discontinuity, at which point he can re-engage the automatic flight plan following function of the flight management computer. With the TRS system 65, the pilot can obtain, from a vertical flight and speed profile, a list of check- and/or turn points "D-Fix" defining a temporary flight plan straddling the discontinuity which can be managed by the flight computer for automatic following and for fuel consumption predictions.

This flight plan discontinuity management functionality is particularly suited to tactical military flights and helicopter flights. In effect, the airways for helicopters are still not standardized or published. Consequently, a common operational case involves taking off from a heliport according to a published procedure, while attempting to reach another zone, possibly through a published approach procedure. Between the two procedures, the operator is responsible for establishing the route. The lateral flight plan plotting method described is therefore particularly useful since it makes it possible to automatically determine the complement to the flight plan that guarantees safety with respect to the relief.

Figure 20:
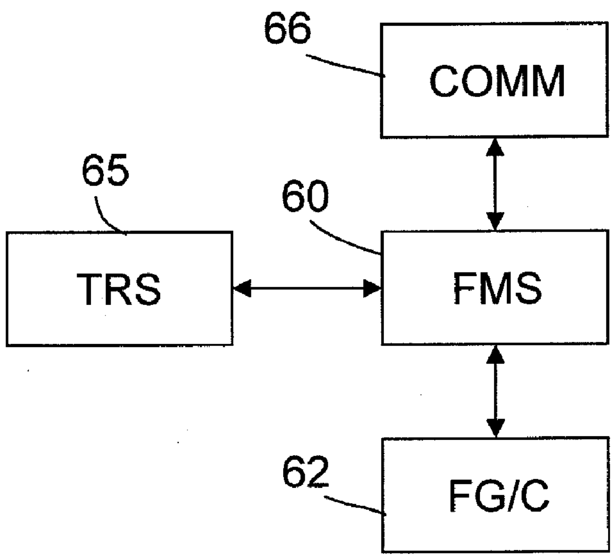

FIG. 20 shows the diagram of an onboard device for automatically reaching predetermined positions for an unmanned aircraft, UAV (Unmanned Aerial Vehicle) or drone, in a functional environment on board an aircraft. It comprises the same elements as that of FIG. 19 apart from the man-machine interface MCDU which is replaced by a ground-onboard communication module COMM 66 enabling an operator on the ground to control the unmanned aircraft.

In the event of the loss of data link between the unmanned aircraft and its controller on the ground, the flight management computer FMS 60 can be programmed to ask the lateral flight plan plotting system 65, based on a vertical flight and speed profile, for a list of check- and/or turn points "D-Fix" defining a flight plan for reaching a predetermined fallback position stored in memory, from which the planned mission can be resumed.

Figure 21:
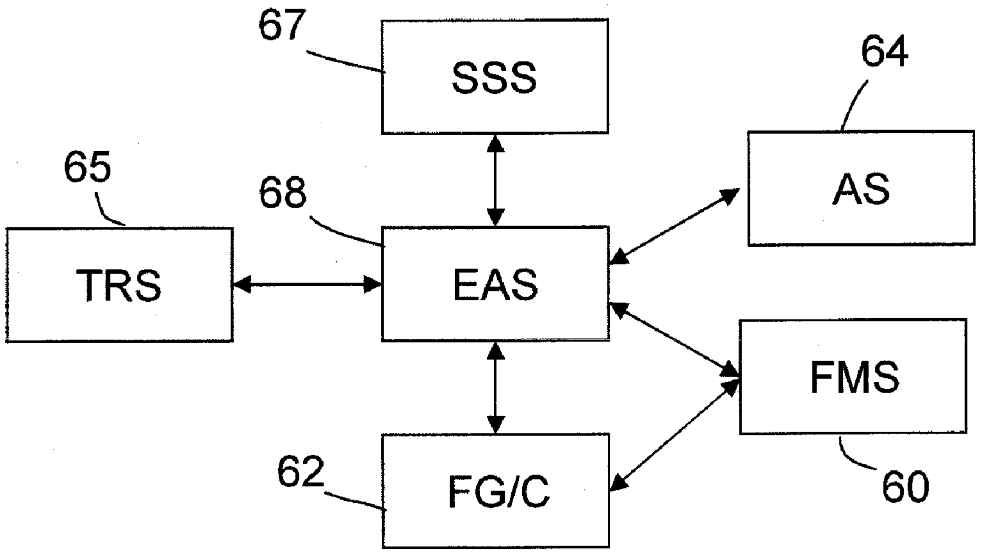

FIG. 21 shows the diagram of an onboard device for an aircraft to automatically reach predetermined positions in a security context. This includes a logic controller EAS 68 for implementing an automatic maneuver for reaching a predetermined position taking over the controls of the flight management computer FMS 60 and of the automatic pilot FG/C 62 at the request of equipment SSS 67 for detecting intrusions and events occurring on board and going against the safety of the aircraft. The logic controller EAS 68 is programmed to, when it takes control of the aircraft:

involve the lateral flight plan plotting system TRS 65 and a system for choosing a diversion airport AS 60 for the choices of a fallback airport, accessible and compatible with the threat detected by the equipment SSS 67 and a check- and/or turn point "Waypoint" also accessible on entering an approach to this airport, compliant with a published official procedure, establish, by the flight management computer FMS 60, a vertical flight and speed profile for reaching the "Waypoint" giving access to the fallback airport, re-involving the lateral flight plan plotting system TRS 65 for the determination of a temporary flight plan for reaching the access check- and/or turn point "Waypoint" approaching the fallback airport, and issue instructions enabling the FG/C 62 to make the aircraft follow the paths conforming to the validated temporary flight plan.

The lateral flight plan plotting method that has just been described makes it possible to determine on the ground, automatically, when preparing a military or civil security mission, the zones in which an aircraft can maneuver given its performance characteristics and the required safety margins. Depending on the configuration of these zones, the operator on the ground may decide to move the check- and/or turn points "D-Fix" obtained or modify the transition altitudes at these points "D-Fix" to take account in the flight plan of the constraints disregarded in the plotting process. Once the flight plan is finalized, it can be loaded on board the aircraft like any flight plan with the existing means (data link, mission preparation memory, etc.).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for determining the horizontal profile of an aircraft flight plan route leading from a departure point to a destination point, complying with vertical flight and speed profiles prescribed on departure and/or on arrival and taking account of the relief and of regulated overfly zones, said method implemented by an onboard device and comprising the following steps:

creating two curvilinear distance maps covering a maneuver zone containing the departure point and destination point and including one and the same set of obstacles to be circumnavigated taking into account the relief, the regulated overfly zones and the vertical flight and speed profiles prescribed on departure and/or on arrival, the first having the departure point as the origin of the distance measurements and the second, the destination point as the origin of the distance measurements, creating, a third curvilinear distance map by summation, for each of its points, of the curvilinear distances that are assigned to them in the first and second curvilinear distance maps, charting, in the third curvilinear distance map, a connected set of iso-distance points forming a sequence of parallelograms and/or of points linking the departure point and destination point, selecting, from the charted connected set of iso-distance points, a series of consecutive points going from the departure point to the destination point via diagonals of its parallelograms, the series being called direct path, approximating the series of points of the direct path by a sequence of straight segments complying with an arbitrary maximum deviation threshold relative to the points of the series and an arbitrary minimum lateral deviation threshold relative to the set of obstacles to be circumnavigated, and choosing points of the intermediate junctions of the straight segments as check-points or turn points in the flight plan.

2. The method as claimed in claim 1, wherein, when there is only one vertical flight and speed profile prescribed on departure, the first curvilinear distance map having the departure point as the origin of the distance measurements is created by taking account of the static constraints due to the relief and to the regulated overfly zones and the dynamic constraint due to the vertical flight and speed profile prescribed on departure whereas the second curvilinear distance map having the destination point as the origin of the distance measurements is created from the set of obstacles to be circumnavigated appearing in the first curvilinear distance map.

3. The method as claimed in claim 1, wherein, when there is only one vertical flight and speed profile prescribed on arrival, the second curvilinear distance map having the destination point as the origin of the distance measurements is created by taking account of the static constraints due to the relief and to the regulated overfly zones and the dynamic constraint due to the vertical flight and speed profile prescribed on arrival whereas the first curvilinear distance map having the point of departure as the origin of the distance measurements is created from the set of obstacles to be circumnavigated appearing in the second curvilinear distance map.

4. The method as claimed in claim 1, wherein, when there are vertical flight and speed profiles prescribed on departure and on arrival, the first and second curvilinear distance maps are created from a set of obstacles to be circumnavigated appearing in two outlines of these curvilinear distance maps:

an outline of the first curvilinear distance map having the departure point as the origin of the distance measurements created by taking account of the static constraints due to the relief and to the regulated overfly zones and the dynamic constraint due to the vertical flight and speed profile prescribed on departure, and an outline of the second curvilinear distance map having the destination point as the origin of the distance measurements being created by taking account of the static constraints due to the relief and to the regulated overfly zones and the dynamic constraint due to the vertical flight and speed profile prescribed on arrival.

5. The method as claimed in claim 1, wherein the set of obstacles to be circumnavigated taken into account in the curvilinear distance maps is complemented by the points of the first and second maps assigned estimations of curvilinear distance showing discontinuities in relation to those assigned to points in the near vicinity.

6. The method as claimed in claim 1, wherein the set of obstacles to be circumnavigated taken into account in the curvilinear distance maps is complemented by lateral safety margins dependent on the flat turn capabilities of the aircraft in its configuration of the moment, when approaching the relief and/or the regulated overfly zone concerned, resulting from following the prescribed vertical flight and speed profile.

7. The method as claimed in claim 6, wherein the lateral safety margins added to the set of listed obstacles to be circumnavigated are determined from a curvilinear distance map having the set of obstacles to be circumnavigated as the origin of the distance measurements.

8. The method as claimed in claim 6, wherein the local thickness of a lateral safety margin takes account of the local wind.

9. The method as claimed in claim 6, wherein the local thickness of a lateral safety margin takes account of the change of heading needed to circumnavigate a relief and/or a regulated overfly zone.

10. The method as claimed in claim 6, wherein the local thickness of a lateral safety margin corresponds to the minimum flat turn radius allowed for the aircraft in the configuration of the moment.

11. The method as claimed in claim 1, wherein the maximum deviation threshold of the sequence of straight segments in relation to the series of points of the direct path is of the order of a minimum flat turn half-radius allowed for the aircraft in its configuration of the moment.

12. The method as claimed in claim 1, wherein the curvilinear distance maps are created by means of a propagation distance transform.

13. The method as claimed in claim 1, wherein the approximation of the series of points of the direct path by a sequence of rectilinear segments is obtained by a progressive construction during which the departure point or respectively destination point of the direct path is taken as the origin of a first segment that is enlarged by adding one by one consecutive points as long as it does not penetrate into the set of obstacles to be circumnavigated and that its deviation relative to the points of the direct path that it short-circuits complies with the arbitrary maximum deviation allowed threshold, other rectilinear segments constructed in the same way being added to the series as long as the destination point, or respectively departure point, of the direct path is not reached.

14. The method as claimed in claim 1, wherein the approximation of the series of points of the direct path by stringing together rectilinear segments is obtained by a dichotomic construction during which the departure point and the destination point of the direct path are initially linked by a rectilinear segment that is replaced, when it penetrates into the set of obstacles to be circumnavigated or its deviation relative to the points of the direct path that it short-circuits exceeds the arbitrary maximum deviation allowed threshold, with a stringing together of two rectilinear segments intersecting at the point of the direct path that is furthest away out of those that it short-circuits, each new segment being in turn replaced by a stringing together of two new segments intersecting at the point of the direct path that is furthest away out of the short-circuited points when it penetrates into the set of obstacles to be circumnavigated or its deviation relative to the points of the direct path that it short-circuits exceeds the arbitrary maximum deviation allowed threshold.

15. The method as claimed in claim 1, implemented in a system for reaching a fallback airport in the event of engine failure.

16. The method as claimed in claim 1, implemented in a flight plan discontinuity management system.

17. The method as claimed in claim 1, implemented in a system for automatically reaching predetermined positions for pilotless aircraft.

18. The method as claimed in claim 1, implemented, in a security context, in a system for automatically reaching predetermined positions for piloted aircraft out of control.

19. The method as claimed in claim 1, implemented on preparing military or civil security missions.

20. The method as claimed in claim 1, implemented during a flight, on a "Dir-to" request to reach a geographic point made by the crew to the flight management computer of the aircraft.

* * * * *